Patented Feb. 1, 1944

2,340,728

UNITED STATES PATENT OFFICE 2,340,728

METHOD OF SIZING PAPER

Chester L. Baker, Penn Wynne, and Charles H. Dedrick, Drexel Hill, Pa., assignors to Philadelphia Quartz Company, Philadelphia, Pa., a corporation of Pennsylvania No Drawing. Application June 28, 1939, Serial No. 281,736

6 Claims. (Cl. 92—21)

This invention relates to method of sizing paper; and it comprises a process wherein paper is sized by adding to the beater a sizing agent formed by aging an alkali metal silicate in dilute solution, said solution being usually partially neutralized by the addition of an acid reagent and being aged until the point is reached at which the addition of aluminum sulfate to the solution in the beater produces a precipitate of hydrous silica in which the weight ratio of $SiO_2$ to $Al_2O_3$ is at least about 8 to 1, the solution being then advantageously diluted in order to stabilize it prior to its addition to the beater, aluminum sulfate being also usually added to the beater in order to produce precipitation of said hydrous silica; all as more fully hereinafter set forth and as claimed.

In the conventional method of sizing paper with silicate of soda it is customary to first furnish the paper beater with water and fibrous material, the fiber amounting to only about ½ to 4 per cent of the beater furnish. At some stage in the beating operation a quantity of silicate of soda in the form of a concentrated commercial solution and in amount usually approximating from 1 to 10 per cent by weight of the cellulose present, is added to the beater. Subsequently a quantity of aluminum sulfate, commonly referred to as "alum," is added. A mutual reaction occurs between the silicate of soda and the aluminum sulfate to form a flocculent precipitate. The precipitate formed may or may not be a definite chemical compound, but as a rule the molecular ratio of $SiO_2$ to $Al_2O_3$ is about 3:1 or less. A ratio of 3:1 would correspond to the chemical formula $Al_2(SiO_3)_3$. In this practice it is customary to use a silicate of soda having a $SiO_2$ to $Na_2O$ weight ratio of from about 3.2 to 1 up to about 3.9 to 1. This material is used in the form of the concentrated commercial solutions containing from about 30 to 43 per cent solids. Usually about 30 to 50 pounds of hydrated aluminum sulfate is used for each 100 pounds of commercial silicate of soda solution.

The degree of improvement in the sheet of paper obtained by the above procedure is generally roughly proportional to the amount of $Al_2O_3$ plus $SiO_2$ which is retained in the sheet. This retention is customarily evaluated by determining the increase in ash content of the paper. In practising the conventional method one usually obtains a retention of about 30 per cent of the total $Al_2O_3$ and $SiO_2$ added to the beater as alum and silicate of soda. In those mills where the white water is recirculated it is occasionally possible to obtain a retention as high as 50 per cent.

We have discovered a new method which makes use of a specially prepared silicate sizing agent and produces a retention of nearly 100 per cent of the $SiO_2$ from the silicate of soda in the finished sheet of paper. This effects an appreciable reduction in the amount of silicate of soda and alum required to produce a given degree of improvement in the finished sheet. Furthermore, our improved method requires less alum per hundred pounds of silicate of soda. In addition the sizing material retained in the sheet is nearly pure hydrated silica as contrasted to the aluminum silicate retained in the conventional practice. A decided improvement in the quality of the paper is achieved, together with increased retention of the other sizing materials used. And other advantages are obtained which will be set forth in detail below.

We have found that if a commercial silicate of soda solution is diluted with water, its alkali content being then partly neutralized with some acidic material, followed by allowing the solution to age for a time, there is a rapid increase in the average statistical size of the colloidal siliceous aggregates in the solution. This increase can be measured with the hydrogen electrode, which shows a definite increase in pH with time. The increased size of the siliceous aggregates can also be demonstrated by precipitation with a polyvalent positive ion, such as $Al^{\times\times\times}$. The precipitate obtained becomes more siliceous as solutions of silicate of soda are used which have been aged for longer periods of time. Thus, it is possible with a suitable dilution, partial neutralizing and aging of silicate of soda solutions to obtain a precipitate with aluminum sulfate which carries a high ratio of $SiO_2$ to $Al_2O_3$ and of course this objective is attained with the use of a smaller quantity of aluminum sulfate. The $Al_2O_3$ from aluminum sulfate is much more expensive than the $SiO_2$ from silicate of soda, so that by the use of our invention it is possible to obtain the desired sizing effect at less cost.

The rate of increase in the average statistical size of the siliceous aggregates, which occurs during the aging of our diluted and partly neutralized silicate solution, will depend upon the concentration of $SiO_2$ in the solution, the concentration of unneutralized alkali, the ambient temperature, etc. Whatever conditions are chosen, it is found that it is advantageous to arrest the size increase of the siliceous aggregates at a suitable point. The optimum size of the siliceous aggregates can be expressed in terms of an optimum aging period for the ambient conditions. When the optimum condition has been reached it is important either that the solution be used immediately or that further growth of the siliceous aggregates be retarded by further diluting the solution with water.

It will be obvious from the above that one can produce the desired state of siliceous aggregation over a fairly wide range of conditions and that the requisite aging time will vary considerably. For any given set of conditions it becomes necessary to determine the optimum aging time. This determination can be made by drawing off samples of the solution at different time intervals and using it in small laboratory paper sizing tests. It will be found that when the percentage retention of $SiO_2$ in the sheet is plotted against time of aging, a curve will be obtained which indicates the best aging time for the partially neutralized silicate of soda solution.

In our work we have been able to obtain satisfactory results by using commercial silicate of soda solutions having a $SiO_2$ to $Na_2O$ ratio falling within the range of 2.8:1 up to 3.9:1. The range of concentrations to which these solutions may be diluted will fall between those containing 0.5 per cent $SiO_2$ and those containing 5.0 per cent $SiO_2$. It is advantageous to neutralize part of the alkali with an acid or an acid salt so that the partially neutralized silicate of soda solution contains between 0.05 per cent and 0.20 per cent of $Na_2O$ as titrated with a standard acid using methyl orange as an indicator. Any acid, salt or other chemical which is capable of reducing the alkalinity of the silicate solution within this range is applicable in our invention. For example, such salts as sodium bisulfate and alum can be employed or, if the presence of iron in the finished paper is unobjectionable, iron sulfate may be used. Any acid capable of neutralizing the silicate solution is applicable, for example $CO_2$ can be used. These reagents serve to accelerate the aging procedure. The permissible temperature for the aging process may vary considerably, but we have obtained good results anywhere within the range from about 5° C. to 40° C.

In carrying out our process in practice the properly conditioned silicate of soda solution is charged into the paper beater which has already been furnished with the necessary fiber and water. After the silicate solution has been thoroughly mixed with the other materials in the beater a small amount of alum is added. This results in the formation of a tough flocculent precipitate of hydrous silica containing a small amount of adsorbed $Al_2O_3$. It is usually not necessary to add more than about 20 pounds of alum per 100 pounds of the original concentrated commercial silicate of soda solution, and good results can often be obtained with even smaller quantities. The best range is from about 5 to 30 pounds of alum to 100 pounds of the commercial silicate solution. And the silicate solution should be added in an amount ranging from about 10 to 100 pounds per 1000 pounds of paper stock, depending upon the extent of sizing desired. This results in a concentration of silicate in the beater ranging from about 0.005 to 0.4 per cent, based on the weight of the commercial silicate solution. The flocculent siliceous precipitate is entrapped by the fibers during the paper making operation and, since it is partially dehydrated on the drier, it effectively cements the cellulose fibers together so that a sheet of superior hardness and finish is obtained.

The chemical composition of the flocculent precipitate formed by our method is quite unique in that it is composed almost entirely of hydrous silica. Analyses of paper sized by our method show that the weight ratio of $SiO_2$ to $Al_2O_3$ in the ash is usually not substantially below 8 to 1 and frequently this ratio reaches 44 to 1, corresponding to a silica content of 98 per cent. It is probable that the precipitate formed in our process is really hydrous silica with a small amount of adsorbed alumina.

We have found that the siliceous precipitate formed in the beater by our method seems to entrap particulate matter which has been added for sizing purposes, such as clay, whiting, blanc fix, titanium dioxide, and so forth, so that a larger proportion of these materials are retained in the paper sheet than is ordinarily achieved in silicate-alum sizing, thus resulting in a sizable economy.

Our invention can be described somewhat more specifically by reference to the following specific examples, which represent practical operations of our process. In each of these examples the results obtained are compared with those obtained in comparative tests in which conventional sizing methods were used.

*Example 1*

For purposes of comparison a lot of paper was sized with silicate of soda and alum according to the conventional procedure, as follows: 1000 pounds of bleached sulphite pulp was worked up in a beater and 40 pounds of a liquid silicate of soda containing 8.85 per cent $Na_2O$ and 28.7 per cent $SiO_2$ was then added. Beating was continued for 15 minutes, whereupon 22 pounds of alum were added. Beating was continued for another 15 minutes, following which the pulp was diluted with water and run on to the paper machine. Examination of the finished sheet showed that the treatment had increased the ash by only 0.38 per cent, based on the weight of the paper. The increased ash analyzed 73 per cent $SiO_2$ and 27 per cent $Al_2O_3$, which corresponds to a $SiO_2:Al_2O_3$ weight ratio of 2.7:1.00 and a retention of about 24.1 per cent of the $SiO_2$ from the silicate of soda and about 30.5 per cent of the $Al_2O_3$ from the alum used.

*Example 2*

In another test we operated three beaters by adding to each 250 pounds dry weight of sulphite pulp, 750 pounds dry weight of ground wood, 100 pounds of clay and 8 pounds of rosin size, water being added in proportion. A sizing agent within the present invention was made up by first mixing 40 pounds of a silicate of soda solution containing 8.85 per cent of $Na_2O$ and 28.7 per cent of $SiO_2$ with 89 gallons of water at room temperatures. To this mixture we added 5 pounds of 66° Bé. sulfuric acid with vigorous agitation. A sample of this partly neutralized silicate of soda solution was found to contain 0.075 per cent of $Na_2O$, as determined by titration against standard acid using methyl orange as an indicator. This solution was allowed to age for two hours at room temperature, which represents the optimum aging time for this particular solution. It was then diluted to 250 gallons with water to stabilize it and to preserve the optimum statistical size in the colloidal siliceous aggregate present. This quantity of sizing agent was added to each beater in addition to 10 pounds of alum.

The properties of the finished sheet obtained in this test were then determined and compared with those of a sheet obtained in a comparative test in which the same materials were furnished to the beaters and in the same quantities with the single exception that our special sizing agent was omitted. The character of the two sheets produced in these tests is shown in Table I.

TABLE I

*Results of comparative tests*

| Character of sheet | Sized by our method | Sized by conventional method |
|---|---|---|
| Basis weight..........pounds.. | 34½ | 35½ |
| Mullen test..............do.... | 8.5 | 8.4 |
| Sugar-dye size test.....secs.. | 47 | 40 |
| Formation.................... | 77 | 57 |
| Bulk......................... | 0.036 | 0.036 |
| Ash................per cent.. | 5.40 | 4.75 |
| Retention.............do.... | 68 | 60 |
| Clay and fiber remaining in white water from suction box...................... | 7.33#/1,000 gal. | 9.97#/1,000 gal. |

The values in the above table for the sugar-dye size test were determined by following the procedure outlined on page 714 of the Technologic Paper of the Bureau of Standards, No. 326, while the values for the formation were determined by using the Gurley densometer as described in "Paper Testing Methods" under the heading "Air Resistance or Porosity," published for the Technical Association of the Pulp and Paper Industry by the Lockwood Trade Journal Co., 10 East 39th St., New York city (1928), pages 73 to 76. The percent retention values given in the table represent the percentage of $SiO_2$ plus $Al_2O_3$ plus clay retained by the paper in terms of the total quantities of these substances added to the beater. The quantities retained by the paper were obtained by ash determinations.

Table I shows clearly the important advantages which are derived from following the present invention. For example, the resistance of the sheet to penetration by a sugar dye solution has been substantially increased which is doubtless due to the higher retention of the rosin size in the process of the present invention. The formation of the sheet produced by our method is considerably better as is also the percentage of ash and the apparent clay retention. Of particular importance is the fact that the white water from the suction box contained less clay and short fibers when our method was used. This shows clearly that a higher retention of short fibers and other sizing materials are obtained by our method. The paper produced in these comparative tests was a 35 pound white, halftone paper.

In addition tests were made in order to determine approximately how much increased retention of sizing materials can be obtained for different amounts of added alum by the use of our process, in comparison with the conventional process wherein silicate of soda and alum are used as sizing agents. In making these tests the same quantities of silicate of soda were added as sizing agents but in the tests representing our new process the silicate of soda had been aged to approximately the optimum extent by dilution, followed by the addition of an acid reagent and then by allowing the acidified and diluted solution to stand. The quantity of alum added was varied by steps. The silicate of soda solution used contained 8.85 per cent of $Na_2O$ and 28.7 per cent of $SiO_2$. 40 pounds of this solution were used to 1000 pounds of pulp. The results obtained are collected in Table II, the values given for the ash increase being based on the weight of the paper.

TABLE II

*Per cent ash increase in paper during sizing*

| Pounds alum used per 1,000 pounds pulp | Conventional method | Our new method |
|---|---|---|
| 2............................................... | 0.12 | 0.08 |
| 3............................................... | 0.12 | 0.13 |
| 4............................................... | 0.12 | 0.61 |
| 5............................................... | 0.13 | 0.69 |
| 6............................................... | 0.13 | 0.73 |
| 7............................................... | 0.13 | 0.79 |
| 8............................................... | 0.14 | 0.86 |
| 9............................................... | 0.14 | 0.88 |
| 10.............................................. | 0.15 | 0.88 |
| 11.............................................. | 0.15 | 0.88 |
| 12.............................................. | 0.18 | 0.88 |

If the results in Table II are compared with those obtained in the conventional method test described in Example 1 it will be seen that it requires about 22 pounds of alum in the conventional method to produce an ash retention of 0.38 per cent whereas this retention can be obtained by our new method by the use of a quantity of alum somewhere between 3 and 4 pounds. In other words approximately 80 per cent of the alum employed in the conventional method can be saved by the use of the new method. The table also shows that the use of 7 pounds of alum in the new method will produce approximately twice the ash retention obtained by the use of 22 pounds in the conventional method. In other words the sizing effect can be doubled and at the same time a saving of about 70 per cent in alum can be realized simultaneously. This effectively demonstrates the advantages obtained by our new method.

While we have described what we consider to be the best embodiments of our process, it is evident that the specific procedures described can be varied to a considerable extent without departing from the purview of this invention. It is possible to employ solutions of potassium silicate or the silicates of other alkali metals in place of sodium silicate solutions. Our sizing agent may be added to the paper stock at any convenient place in the paper manufacturing procedure provided that sufficient time is provided for the siliceous precipitate to form and to combine with the paper stock in order to produce the desired sizing. The present invention can be employed in connection with any of the customary paper manufacturing processes. It is only necessary to substitute the sizing agent of the present invention in whole or in part for the sizing agent or agents employed previously. Our sizing agent, can, of course, be employed in admixture with any of the conventional sizing agents which are compatible therewith. And the sizing agent can be precipitated in the presence of the paper stock by any reagent capable of precipitating hydrous silica from the sizing agent. Magnesium sulfate is an example. And iron sulfate can be used provided that the presence of a small amount of iron in the paper is unobjectionable. Other modifications of our invention which fall within the scope of the following claims will be immediately evident to those skilled in this art.

What we claim is:

1. In the sizing of paper, the process which comprises forming a dilute solution of sodium silicate having a weight ratio of $SiO_2$ to $Na_2O$ within the range of about 2.8:1 to 3.9:1 and a concentration within the range of about 0.5 to 5.0 per cent by weight of $SiO_2$, reducing the alkalinity of the solution until it is within the range of about 0.05 to 0.2 per cent $Na_2O$ as determined by titration using methyl orange as indicator, aging the resulting solution until the addition of a small quantity of aluminum sulfate causes the precipitation of a hydrous silicate having a weight ratio of $SiO_2$ to $Al_2O_3$ not substantially less than 8 to 1, adding the aged solution to a beater furnished with the usual water and paper pulp and also adding sufficient aluminum sulfate to cause the precipitation of substantially the entire $SiO_2$ content of the beater as hydrous silicate under conditions causing said precipitate to combine with the paper pulp.

2. In the preparation of sizing agents suitable for the sizing of paper, the process which comprises preparing a solution of sodium silicate having a weight ratio of $SiO_2$ to $Na_2O$ ranging from about 2.8:1 to 3.9:1 and a concentration ranging from about 0.5 to 5.0 per cent $SiO_2$ by weight, adding an neutralizing reagent to produce an alkalinity ranging from about 0.05 to 0.2 per cent $Na_2O$, aging the resulting solution until, upon the addition of a small quantity of alum, a precipitate of hydrous silica will form having a weight ratio of $SiO_2$ to $Al_2O_3$ of not substantially less than 8 to 1, and diluting the aged solution substantially to stabilize it.

3. In the process of sizing paper wherein sizing agents are added to a beater furnished with the usual dilute paper stock, the steps which comprise diluting a concentrated commercial silicate of soda solution having a weight ratio of $SiO_2$ to $NaO_2$ within the range of about 2.8:1 to 3.9:1 to produce a concentration within the range of about 0.5 to 5.0 per cent by weight of $SiO_2$, reducing the alkalinity of said solution to within the range of about 0.05 to 0.2 per cent $NaO_2$ as determined by titration with methyl orange as indicator, aging the resulting solution to the point at which, when added to said stock in conjunction with aluminum sulfate in quantities sufficient to produce the desired degree of sizing a precipitate of hydrous silica is formed in which the weight ratio of $SiO_2$ to $Al_2O_3$ is at least about 8 to 1, then adding the so-prepared solution to the beater in sizing concentrations and precipitating said hydrous silica in the presence of said paper stock, thereby causing said precipitate to combine with the paper stock.

4. The process of claim 3 wherein the hydrous silica precipitate is formed by the addition of aluminum sulfate to the beater in the proportion of about 5 to 30 pounds to 100 pounds of the concentrated commercial silicate of soda solution.

5. The process of claim 3 wherein the silicate is used in an amount ranging from about 10 to 100 pounds of the concentrated commercial solution to 1000 pounds of paper stock.

6. In the process of sizing paper wherein sizing agents are added to a beater furnished with the usual dilute paper stock, the steps which comprise diluting a silicate of soda solution containing about 8.85 per cent of $Na_2O$ and 28.7 per cent of $SiO_2$ with water, in the proportions of about 40 pounds solution to 89 gallons of water, adding sulfuric acid to the dilute solution sufficient to reduce the alkalinity to about 0.075 per cent $Na_2O$, as determined by titration with methyl orange as indicator, aging the resulting solution for a period of about 2 hours, diluting the aged solution with water and adding it to the beater together with sufficient aluminum sulfate to cause the precipitation of hydrous silica, thereby causing said precipitate to combine with the paper stock.

CHESTER L. BAKER.
CHARLES H. DEDRICK.